United States Patent [19]

Slavin

[11] 3,889,063

[45] June 10, 1975

[54] MULTIPLEXED DIGITAL DATA COMMUNICATION SYSTEM

[75] Inventor: Martin J. Slavin, Huntington, L.I., N.Y.

[73] Assignee: Phonplex Corporation, Huntington, L.I., N.Y.

[22] Filed: Sept. 24, 1973

[21] Appl. No.: 399,037

Related U.S. Application Data

[63] Continuation of Ser. No. 173,168, Aug. 19, 1971.

[52] U.S. Cl....... 179/15 A; 179/15 BA; 179/15 BY; 179/15 BD

[51] Int. Cl............................................... H04j 3/00

[58] Field of Search...... 179/15 BY, 15 BA, 15 AL, 179/15 BD

[56] References Cited

UNITED STATES PATENTS

| | | | |
|---|---|---|---|
| 2,740,838 | 4/1956 | Pierce | 179/15 BD |
| 3,040,130 | 6/1962 | Hughes | 179/15 BD |
| 3,067,291 | 12/1962 | Lewinter | 179/15 AP |
| 3,165,588 | 1/1965 | Holzer | 179/15 BD |
| 3,660,606 | 5/1972 | De Witt | 179/15 BA |

*Primary Examiner*—Kathleen H. Claffy
*Assistant Examiner*—Thomas D'Amico
*Attorney, Agent, or Firm*—Blum, Moscovitz, Friedman & Kaplan

[57] ABSTRACT

A multiplexed digital data communication system wherein analog signals received from a conventional telephone system having a plurality of channels are multiplexed at a high sampling rate and converted to a series of discrete digital signals in a series of time slots. The system includes data transmission means for substituting data signals for said discrete digital signals in periodically spaced time slots. The communication system would include a plurality of local stations coupled to a common transmission line to which the series of discrete digital signals is applied, each of the local stations being adapted to demultiplex and convert to analog signals the portion of said discrete digital signal intended for it, and to supply said analog signals to the user. Similarly, the local station can multiplex and digitize user initiated analog signals for application to the transmission line, while the central station has demultiplexing and digital to analog capabilities.

22 Claims, 4 Drawing Figures

MULTIPLEXED DIGITAL DATA COMMUNICATION SYSTEM

This is a continuation, of application Ser. No. 173,168, filed Aug. 19, 1971.

BACKGROUND OF THE INVENTION

This invention relates generally to a local communication system which is coupled to a public utility telephone system. Many local users, such as hospitals, hotels, and industrial plants and offices, have specialized requirements for their local communication systems. However, the conventional systems are relatively inflexible, generally requiring hard wired connections between each local station in the system, and the central station which is connected to the public utility telephone system. Where the user also requires the wide transmission of television and/or high fidelity sound signals to a plurality of remote stations, separate, hard-wired systems are frequently required even though existing telephone cables are available. Further, where users also require the transmission of data or the operation of a teletypewriter, either separate systems are generally required, or, where the telephone system is utilized, whole channels of the conventional telephone systems must be allocated for this purpose.

By providing an integrated digital data communication system, all of the foregoing functions, plus additional functions can be performed by a single system.

SUMMARY OF THE INVENTION

Generally speaking, in accordance with the invention, a multiplexed digital data communication system for connection to a telephone system is provided comprising central station means having analog to digital converter means for sampling the analog signal from said telephone system and converting said signal to a series of discrete digital signals in a series of time slots. The central station is coupled to a plurality of local stations by a transmission line, said series of discrete digital signals being applied to said transmission line. Each of said local stations is adapted to receive the series of discrete digital signals associated therewith, and would include digital to analog converter means for converting said series of discrete digital signals to an analog output signal. Each of said local stations would also include analog to digital converter means for converting audio signals applied thereto to a series of discrete digital signals in a series of time slots. Data transmission means are provided for substituting a digital data signal for the discrete digital signal in each of periodically spaced time slots for the simultaneous transmission of data and voice communication.

The central station means may be adapted for the simultaneous operation of a plurality of system channels of operation, and may be adapted to receive a plurality of input channels from said telephone system. Said central station includes multiplexing means adapted to sequentially sample each of said input channels and transmit the contents of said channels as a single signal consisting of a series of said discrete digital signals in a series of time slots, each of said system channels having groups of said time slots associated therewith, corresponding to the content of one of said input channels. Each local station means is adapted to monitor at least a portion of said system channels and to detect an address associated therewith in said channels. Upon detection of such an address, each of said local station means is adapted to provide an indication of such detection, and to permit the receipt of the discrete digital signals associated with said channel, said local station means including digital to analog converter means for converting said discrete digital signals into an analog signal for delivery to the user.

Each of said local station means includes analog to digital conversion means for converting analog audio signals applied thereto to a series of discrete digital signals in a series of time slots, and multiplexing means for inserting each of said discrete digital signals in a time slot associated with one of said user channels.

Each communication system may include means for transmitting alarm signals, remote control signals, T.V. signals, high fidelity sound systems, and status signals along said transmission line between said central and said remote station.

Accordingly, one object of the arrangement according to the invention is to provide a digital data communication system wherein both conventional voice telephone communication and data communication can be simultaneously carried out without the allocation of separate channels for data transmission.

A further object of the digital data communication system according to the invention is the provision of a flexible system utilizing a single transmission line connection between a plurality of remote stations and a central station for the transmission of a plurality of channels of telephone data, wherein each of the remote stations is adapted to detect its address for the purposes of receiving a call, and to transmit its address for the purposes of establishing connection when making a call.

Still a further object of the digital data communication system is to provide a system which permits the transmission of television and/or high fidelity sound signals over a line carrying multi-channel telephone communications.

Another object of the arrangement according to the invention is to provide a digital data communication system which permits conventional telephone communications, and also permits the transmission of alarm and status data from remote stations to the central station, and the remote control of utilization circuits at the local station from the central station.

Still other objects and advantages of the invention will in part be obvious and will in part be apparent from the specification and drawings.

The invention accordingly comprises the features of construction, combinations of elements, and arrangements of parts which will be exemplified in the constructions hereinafter set forth, and the scope of the invention will be indicated in the claims.

DESCRIPTION OF THE PREFERRED EMBODIMENTS

Figure 1:
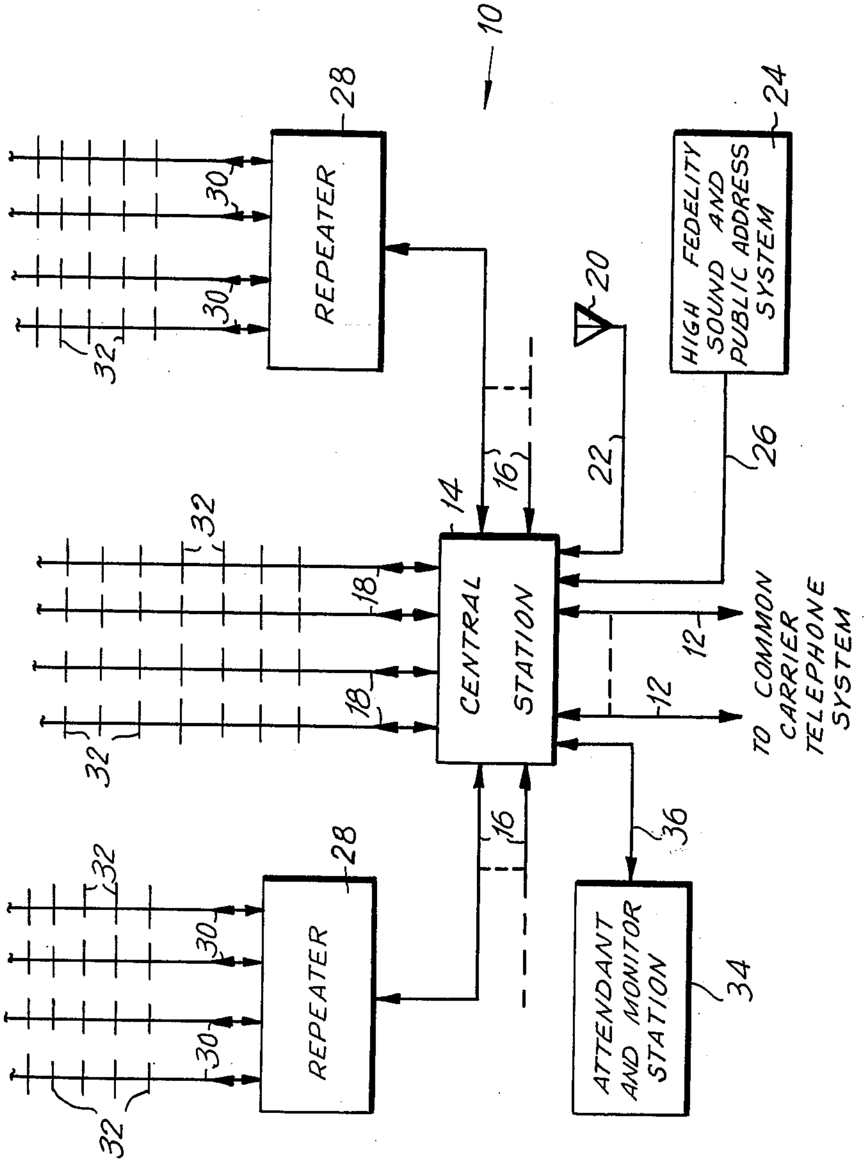
FIG. 1 is a schematic block diagram of the digital data communication system according to the invention.

Referring now to FIG. 1, the digital data communication system 10 depicted is adapted for connection to a common carrier telephone system by a plurality of lines 12 representing a plurality of trunks or input channels. Said input channels function in a conventional manner, for transmitting one telephone connection at a time, said telephone connection generally carrying an audio signal representative of human speech. The audio signals from lines 12 are applied to a central station 14 which, among other functions, digitizes and multiplexes the audio signals received from lines 12, and applies a signal consisting of a series of discrete digital signals in a series of time slots to transmission lines 16 and 18. Said transmission lines are coaxial cables, in the embodiment of FIG. 1, due to the requirement that said lines also carry a television signal, but, in other embodiments, such transmission lines need not be formed as a coaxial cable.

Antenna 20 is provided for receiving T.V. signals, and for applying said signals along lines 22 to a central station 14, which, in turn, applies said T.V. signals to transmission lines 16 and 18. Still a further source of signals for transmission lines 16 and 18, is high fidelity sound and public address system 24, which is coupled to said transmission lines through line 26 and central station 14.

These three types of signals may be simultaneously transmitted along said transmission line if the series of discrete digital signals modulate a high frequency carrier of a frequency different from the carrier wave of the T.V. signals and the high fidelity sound and public address system. In this manner, the same transmission line can transmit all three types of signals.

Transmission lines 16, two of which are shown in FIG. 1 by way of example, differ from transmission line 18 in that they are each coupled to a repeater 28 which serves to amplify the signal received from transmission line 16 and to resynchronize the digital signal. Repeater 28 can perform other functions as will be more particularly discussed below, and the output thereof is coupled to transmission lines 30, of which four are shown by way of example. Transmission lines 30 are similar to transmission lines 18 directly coupled to central station 14, four of the latter also being shown by way of example. Each of transmission lines 18 and 30 connect to a plurality of local stations indicated schematically by cross lines 32, each of which tap off the transmission lines for two way communication therewith. Each of said local stations constitute a terminal for telephone and data transmission, and may also include receivers for the television and high frequency sound and public address signal.

The system is also provided with an attendant and monitor station 34 coupled to a central station 14 by line 36 for the purpose of providing operator control of the system, and for monitoring certain status, alarm and other data transmissions as are more particularly discussed below. The attendant and monitor station may include memory means for recording such status, alarm and other data information as well as display, and control function generating devices such as CRT tubes and the like.

The digital data transmission system according to the invention utilizes multiplexing techniques to achieve simultaneous transmission of the various signals along single transmission lines. Thus, frequency multiplexing is utilized to permit the simultaneous transmission of the telephone-data signal, the television signal, and the high fidelity sound and public address signal. Time division multiplexing techniques are utilized to permit the simultaneous transmission of a plurality of channels of telephone communication between the central station and the remote station. Thus, the central station 14 provides communication between a remote station 32 and one of the input channels or trunks 12 by assigning one of a plurality of internal system channels to this connection. The central station converts the analog signal received from one of channels 12 to a series of discrete digital signals in a series of time slots utlizing sampling and analog to digital conversion techniques. The multiplexing function performed by the central station consists of dividing each cycle of the available time into a plurality of discrete intervals or time slots which are assigned successively to each of the channels of information to be transmitted. Each interval or time slot is in turn divided into a plurality of increments, one of said increments being assigned to each bit of the digital code formed by the analog to digital conversion. Other increments may be assigned for the transmission of clock and synchronization data. The foregoing multiplexing technique is referred to as pulse code modulation.

The local stations 32 according to the invention are also adapted to digitize the voice signals applied thereto and to multiplex said digitized signals into the time slots associated with the assigned system channel for transmission to the central station along the respective transmission lines. Both the central station and local stations are each adapted to demultiplex the signal received from each transmission line and to convert the digital signal to an analog signal for application to input channels or trunks 12, in the case of central station 14, or to an ear phone or speaker, in the case of a local station 32.

The above-described multiplexing technique utilizes an extremely high sampling rate, on the order of 56,000 bits per second per system channel in one embodiment. This high sampling rate permits the simultaneous transmission of telephone communication and data along the common transmission line. This result is achieved by the digital data communication system according to the invention by the substitution of data signals for the digitized telephone communication signal in periodically spaced time slots in the signal transmitted along the respective transmission lines. While this method results in some reduction in the quality of sound transmission, the reduction is slight where the data rate is low, due to the extremely high multiplexing sampling rate. In fact, the normal user cannot detect the diminishing in quality of transmission caused by the loss of some of the digitized telephone signals. Since much of the data to be transmitted over such system is transmitted at a relatively low sampling rate, simultaneous transmission of data and telephone communication is permitted. Thus, in a teletypewriter, only 300 bits per second is required for full transmission, although full channels must be allocated to such transmission where conventional systems are utilized.

Figure 2:
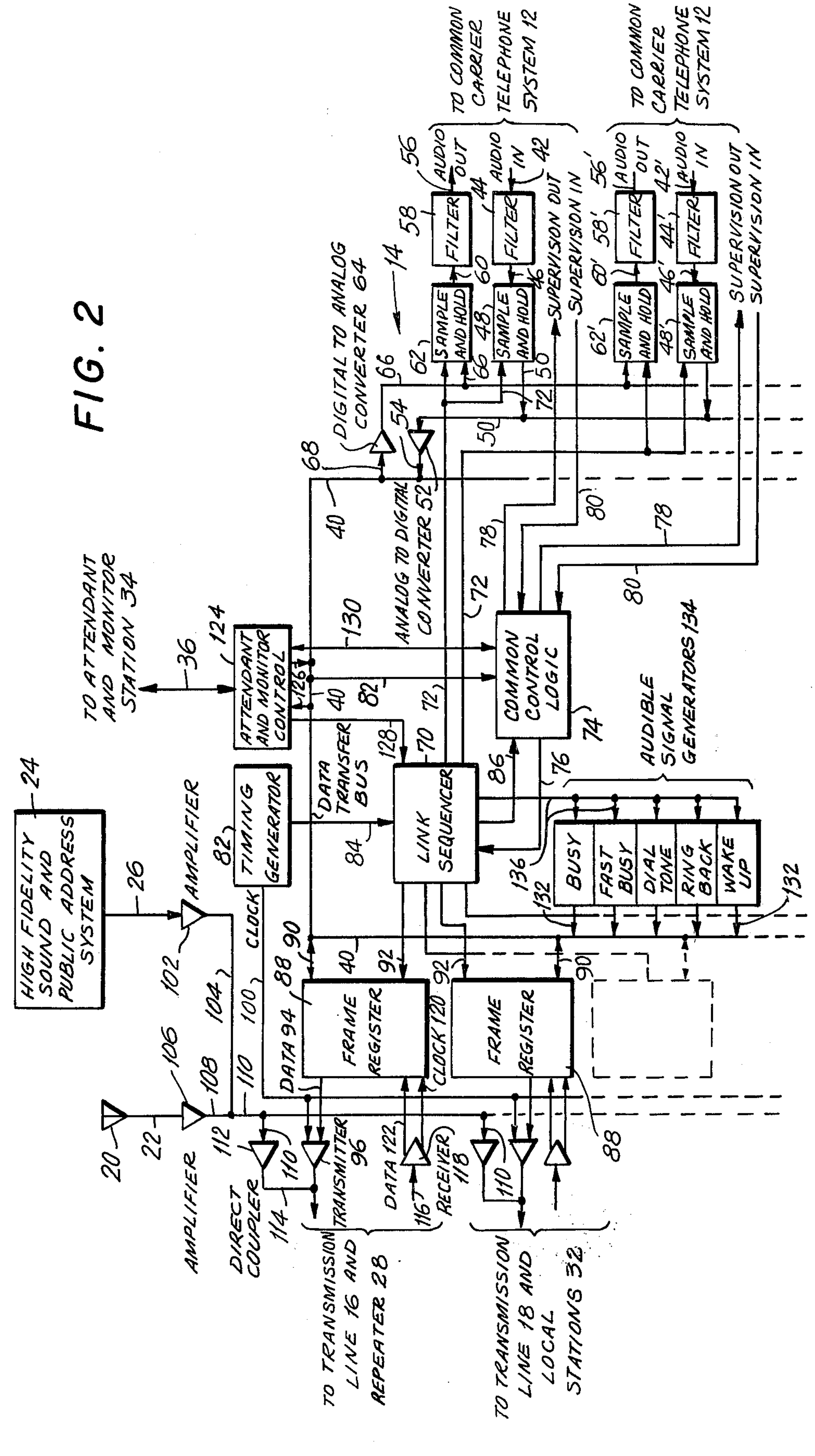
FIG. 2 is a schematic block diagram of the central station of the system of FIG. 1.

Referring now to FIG. 2, one embodiment of the central station 14 according to the invention is depicted.

The heart of the central station according to the invention is data transfer buss 40 which is a high speed parallel time multiplexed transfer buss on which all conversational links in the system appear. Thus, each channel 12 coming from the common carrier telephone system is coupled to buss 40. In each case, this coupling includes an audio input line 42 connected to filter 44 which in turn is connected by line 46 to a sample and hold circuit 48, which samples increments of the analog audio signal for transmission along lines 50 to analog to digital converter 52 which converts said analog sample into a discrete digital signal occupying a single time slot. This digital signal is applied along line 54 to data transfer buss 40.

The audio output to each channel 12 is received at an audio output line 56 from a filter 58, which in turn receives a signal from a line 60. The signal applied to the line 60 is received from a sample and hold circuit 62 which serves to reconstruct an analog signal from incremental analog signals received from a digital to analog converter 64 along lines 66. Digital to analog converter 64 receives the discrete digital signals in coded form from the data transfer buss and converts the digital signals in each time slots to the analog increment applied to sample and hold circuit 62, digital to analog converter 64 being coupled to data transfer buss by line 68.

Data transfer buss 40 has on it a fully multiplexed signal. This multiplexing is achieved by means of link sequencer 70 which sets up the connection to and from the data transfer buss by actuating the respective sample and hold circuits of either the audio in or audio out line of the appropriate input channel 12 associated with each time slot of data. In this manner, a single digital to analog converter and a single analog to digital converter serves for all of the input channels. Thus, link sequencer 70 is joined by one of the lines 72 to each of the sample and hold circuits. The operation of link sequencer 70 is governed by a common control logic 74 which allocates the system channels to the various connections between the local stations and the input channel. For this purpose, common control logic 74 is coupled to link sequencer 70 by line 76 for the purposes of controlling said link sequencer. The common control logic is connected to each of the input channels 12 of the common carrier telephone system by lines 78 and 80 which respectively transmit supervisory signals out of and into the communication system according to the invention. Such supervisory signals would include dialing and ringing signals, as well as signals requesting operator assistance from the common carrier telephone system. Common control logic 74 also monitors the data transfer buss 40 by means of line 82 to detect requests for change in status from the local stations 32, such as the availability of a system channel, or a demand for a channel by a local station.

Common control logic 74 is preferably reprogrammable to permit adjustments in system channel allocations and connection routing. Thus, only some of the local stations may be authorized direct connection to the common carrier telephone system without operator assistance and the identification of such stations can be controlled at the common control logic. Another example of such a reprogrammable function would be the assignment of local stations having such priority as to justify cutting off other users when such local stations require a system channel. The programmable common control logic 74 can also be used for automatic record keeping, such as maintaining toll records and performing system utilization studies.

The timing for the digital data communication system is provided by a timing generator 82 which applies clock and synchronization signals to link sequencer 70 along line 84. The remaining components of the central station obtain their timing and synchronization signals from the control signals transmitted by the link sequencer, common control logic 74 being coupled by line 86 to link sequencer 70 for the purposes of receiving such clock and synchronization signals. In this manner, the digitizing and multiplexing functions are coordinately performed. As shown in FIG. 1, the central station 14 is coupled to each transmission line 16 and 18. In FIG 2, only one each of transmission line 16 and 18 are shown by way of example. Each of said transmission line are coupled to data transfer buss 40 by a frame register 88, which provides serial to parallel and parallel to serial conversion of the communication signal going out to and coming in from its respective transmission line. Each frame register is coupled to data transfer buss 40 for applying signals thereto and receiving signals therefrom by a line 90, and is coupled to link sequencer 70 for control thereby by line 92. Link sequencer 70 controls the time slots in which frame register 70 receives discrete digital signals from and supplies discrete digital signals to data transfer buss 40 so that the time slots associated with each system channel corresponding to one of the input channels 12 is applied to the appropriate transmission line for ultimate connection to the appropriate local station 32.

The connection between transmission lines 16 and 18 and the corresponding frame register 88 is achieved by means of line 94 which transmits the signals received from the data transfer box to transmitter 96, which in turn is coupled to the respective transmission line by line 98. At this point in the system, additional signals are applied to the transmission lines to form the communication signal. Thus, a clock signal from timing generator 82 is applied along lines 100 to furnish each of repeaters 28 and local stations 32 with a clock signal for the coordinate operation thereof. Further, high fidelity sound and public address system 24 and television antenna 20 are each directly coupled to each of the transmission lines 16 and 18 for the direct application of their respective signals thereto on a non-interferring basis due to the frequency division multiplexing described above. Thus, high fidelity sound and public address system 24 is coupled by line 26 to an amplifier 102, which in turn is coupled to a line 104. Television antenna 20 is coupled by line 22 to amplifier 106, which is in turn coupled to line 108. Lines 104 and 108 are coupled by line 110 to a direct coupler 112 which taps onto line 98 by means of line 114.

The communication signal is received from transmission lines 16 and 18 by a line 116 which applies said signal to a receiver 118, which in turn applies both the clock and informational data portions of said communication signal to frame register 88 by means of lines 120 and 122 respectively.

The attendant and monitor station 34 is connected by line 36 to an attendant and monitor control 124. The attendant and monitor station 34 is adapted for selective monitoring and manual operation and control over the digital data communication system according to the invention. One function performed at the attendant and monitor station 34 would be that of the local switchboard operator, which renders assistance to the local stations, and to general callers from the common carrier telephone system. For this purpose, attendant and monitor control is coupled to data transfer buss 40 by lines 126. The attendant monitor control is coupled to link sequencer 70 and common control logic 74 by lines 128 and 130 respectively to permit detection of the status of each component of the system, and for the selective control of channel allocation, if desired. Further, the attendant and monitor station 34 also receives certain data transmitted in the communication signal and applied to the data transfer buss 40, such as alarm and status data, as will be more particularly described below.

Data transfer buss 40 is also coupled by lines 132 to audible signal generators 134 which provide conventional audible signals used in telephone communication systems such as "busy," "fast busy," "dial tone," "ring back," and "wake-up," audible signals. These audible signals are applied to the data transfer buss for communication to input channels 12 or transmission lines 18 in response to control signals transmitted from link sequencer 70 along lines 136. Although the audible signals generated 174 could also provide such signals for transmission line 16, in the preferred embodiment of the arrangement according to the invention, such audible signal generator would also be included in each repeater 28, for the purposes of providing the required audible signals to the transmission lines 30 serviced thereby.

Figure 3:
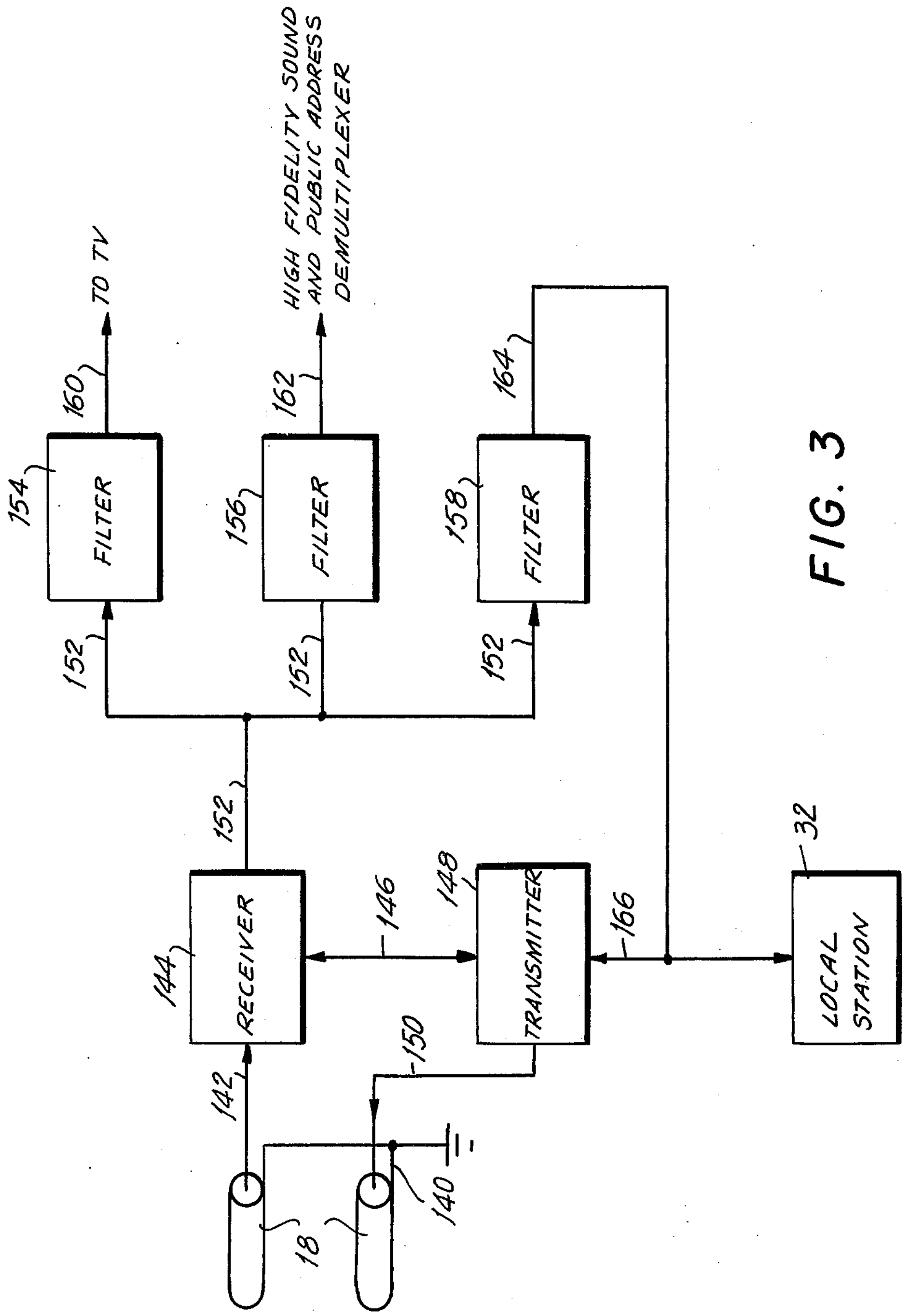
FIG. 3 is a schematic block diagram of the interface between the transmission line and a local station of the system of FIG. 1.

Referring now to FIG. 3, the coupling between one local station 32 and transmission line 18 is shown by way of example. Similar couplings would be used in connecting the local stations through transmission lines 16 and 30. In the embodiment depicted, the transmission line 18 is in the form of a coaxial cable, the outer conductor of which is grounded by lines 140. The coupling circuitry is connected in series with the coaxial cable by a bridge coupler (not shown) which would complete the circuit of the coaxial cable 18 should the coupling circuitry be disconnected, to avoid disconnection of other local stations. The communication signal applied to transmission line 18 is applied by line 142 to a receiver 144. Said receiver is coupled by line 146 to a transmitter 148, which in turn is connected back to transmission line 18 by a line 150. In this manner, the system provides continuity of communication through the coupling circuitry and along the transmission line to the next local station. The output of receiver 144 is taken along lines 152 to separate filters 154, 156 and 158, each of which is tuned to the carrier frequency carrying each of the frequency multiplexed components of the communication system. Thus, filter 154 would be adapted to pass the television signal and to pass said television along line 160 to a television receiver, located at the local station. Filter 156 would similarly be adapted to pass the high fidelity sound and public address signal, which might be applied along line 162 to a high fidelity sound and public address demultiplexer if the latter signal is also time division multiplexed to permit a plurality of channels of transmission.

Finally, filter 158 would pass the telephone and data portions of the communication signal along a line 164 which taps onto line 166, the latter line providing communication between local station 32 and transmitter 148.

Figure 4:
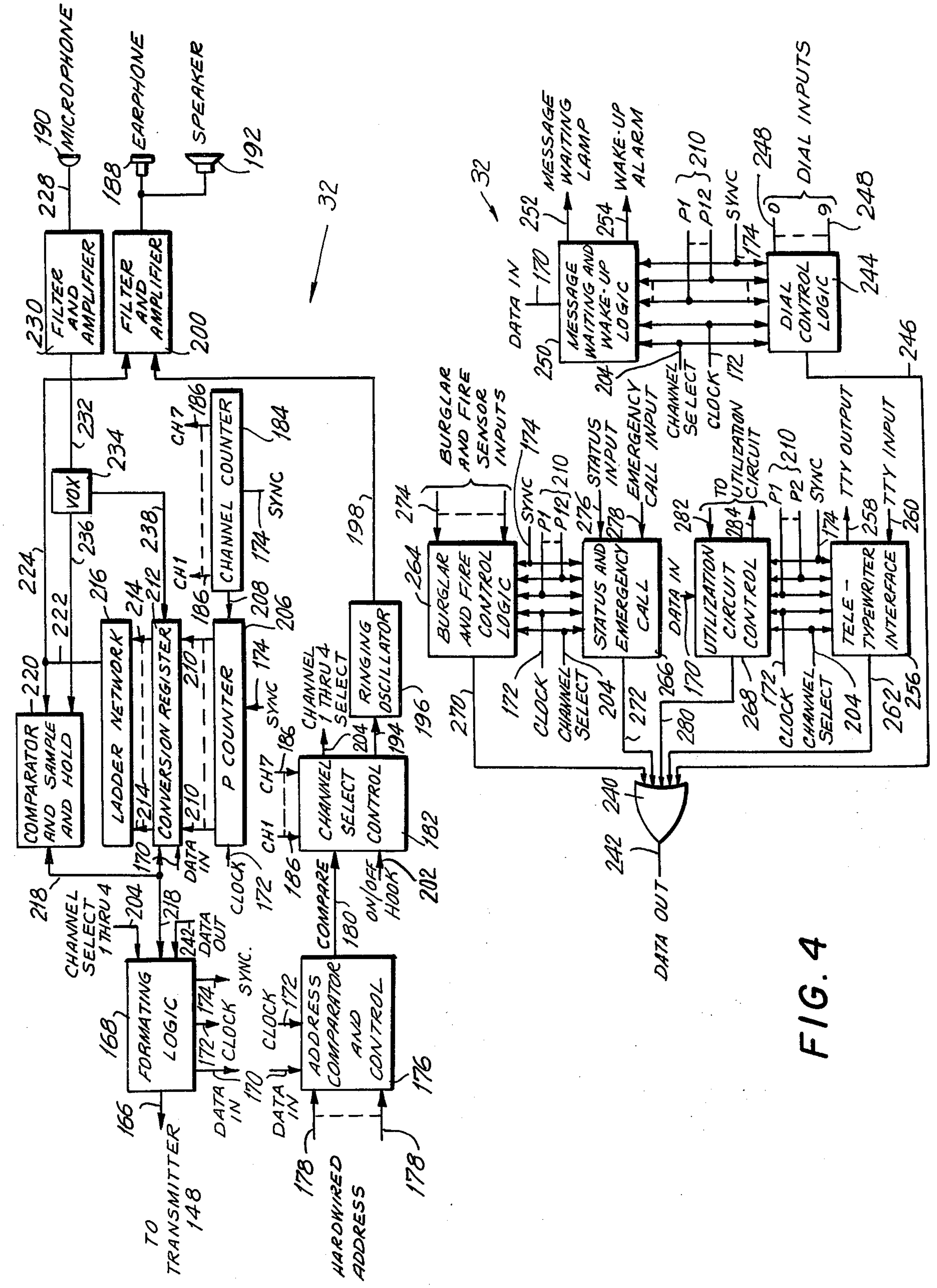
FIG. 4 is a schematic block diagram of the local station of the system of FIG. 1.

One embodiment of the local station according to the invention is shown in FIG. 4. Line 166 from transmitter 148 is connected to a formatting logic 168 which breaks up the incoming signal into its informational "data in" component transmitted along line 170, a "clock" component transmitted along line 172 and a synchronization component transmitted along line 174. The formatting logic also serves to assemble the signal to be applied to transmitter 148, and by said transmitter to transmission line 18.

The data in and clock signals are applied to an address comparator and control 176, which serves to compare address signals in the received informational data to determine if this local station is being called on any of the system channels. The address of this particular local channel is represented by a hard wired circuit schematically depicted by lines 178. The result of this comparison is applied along line 180 to a channel select control 182. The local station is provided with a channel counter 184 which receives the synchronization signal from line 174 and produces as its output, signals representative of the location of each of the system channels associated with the particular transmission line 18. In the embodiment of FIG. 4, seven such channels are allocated to transmission line 18, and appropriate output signals are applied along lines 186 to channel select control 182 to permit the identification of the particular channel on which the communications directed to this local station are to be found. The local station is provided with at least one audio receiver and transmitter in the form, for example, of earphone 188 and microphone 180. A speaker 192 may also be provided. Channel select control 182 serves to selectively connect said earphone and speaker to receive the audio communication directed to this station. For this purpose, channel select control 182 is connected along line 194 to a ringing oscillator 196, which in turn is connected through a line 198 to a filter and amplifier 200. The ringing oscillator 196 provides the audible ringing of the speaker to alert the user that the instrument is to be used. A further input to channel select control 182 is line 202 which provides a connection to the "on/off" hook of the users telephone instrument. The channel select control serves to identify a vacant system channel, if any, when the user places said hook in the on position. The channel select control is adapted to transmit along the thus identified channel the address of this local station, so that both the attendant and the common control logic 74 of central station 14 can identify the particular local station about to place a call. This information is transmitted along line 204 to the formatting logic 168 for incorporation in the communication signal on transmission line 18. In the embodiment of FIG. 4, this local station is permitted to select only between four of the seven system channels, to limit channel availability. This structure permits each local station to retain its own hard wired address and to be displaceable to any position along any of the transmission lines without requiring any change in the address. In other words, the address is associated with a particular item of hardward, namely the local station, rather than with any particular location along a transmission line. This feature provides substantial flexibility to the system.

The synchronization signal from line 174 and the clock signal from line 172 is provided to a P counter 206 which also receives channel signals from the channel counter 184 along line 208. The output of P counter 206, which provides frame timing for the local station, is applied along line 210 to a conversion register 212, which in turn is coupled by lines 214 to a latter network 216. Formatting logic 168 is coupled by lines 218 to a comparator and sample and hold circuit 220, and to conversion register 214. The comparator and sample and hold circuit 220, conversion register 212, and ladder network 216 provide multiplexing and demultiplexing, as well as analog to digital and digital to analog conversion of signals received by and transmitted by local station 32. Thus, the informational data in component from formatting logic 168 is applied along line 170 to conversion register 212 in the form of discrete digital signals. A fully demultiplexed analog voice message is produced at line 222 by ladder network 216 and applied to line 224 which connects with filter and amplifier 200. This analog signal is applied along line 226 to the earphone 188 and speaker 192 for receipt by the user as an audio signal corresponding to the audio signal transmitted by one of the local stations, or by one of the input channels 12.

On the other hand, the audio output of microphone 190 is applied along line 228 to filter and amplifier 230, which in turn is coupled by line 232 to vox switch 234, which is used to turn on the analog to digital conversion at the time a voice analog signal is received. Vox switch 234 is coupled to comparator and sample and hold circuits 220 by line 236, and to conversion register 212 by line 238. The use of the vox switch prevents ambient noise in the vicinity of the local station from interferring with audio coming in over the transmission lines. Comparator and sample and hold circuit 220, ladder network 216, and conversion register 212 all combine to digitize and multiplex the voice signal from microphone 190 and to apply said signal to line 218 for formatting in formatting logic 168 before application to transmission line 18.

The foregoing features of local station 32 according to the invention provide the two way voice communication of a basic telephone system. A further contributor to the communication signal on transmission line 18 is gate 240 which provides output data to line 242 for formatting and insertion in the communication signal by formatting logic 168. One feature of formatting logic 168 is that it permits the substitution of such data for certain of the discrete digital signals representative of the audio signal being transmitted. Where this substitution is accomplished in periodically spaced time slots, material degradation of audio transmission is avoided. The data output to gate 240 may be supplied from one or more of a plurality of sources. Where no audio signal is being transmitted when output data from gate 240 is to be transmitted, channel select control 182 will find an available system channel, if any, for the transmission of said data output along with suitable address information identifying the local station sending the data.

Thus, one such data input would be from dial control logic 244 coupled to gate 240 by line 246. The dial control logic is coupled to manually controlled dial input 0 through 9 shown schematically by lines 248. The synchronization and clock signals are applied to said dial control logic along lines 174 and 172 respectively from the formatting logic, while frame timing signals are provided along lines 210 from P counter 206 and a channel select signal is provided from channel select control 182 along line 204. Similar connections are made to a message waiting and wake-up logic 250, which rather than supplying data to the communication signal, responds to data contained therein. Thus, a connection to line 170 is provided for the receipt of the data in portion of the communication signal. The message waiting and wake-up logic, upon detection of a message waiting or wake-up signal intended for this local station, as indicated by the channel select control, serves to actuate either a message waiting lamp coupled by line 252 or a wake-up alarm coupled by line 254, as appropriate.

Teletypewriter interface 256 also receives synchronization, clock, channel select, frame timing and data in signals along corresponding lines from formatting logic 168, channel select 182, and P counter 206. The teletypewriter interface is adapted to detect teletypewriter signals from the data in and apply it to TTY output 258, and to receive teletypewriter signals from TTY input 260 for application along line 262 to gate 240 and formatting logic 168.

Exemplary of other features of the system according to the invention are burglar and fire control logic 264, status and emergency call circuit 266 and utilization circuit control 268. Each of these components receive the synchronization, clock, channel select and frame timing signals. The burglar and fire control logic 264 and status and emergency call circuit 266 are merely data transmitters, transmitting data along lines 270 and 272 respectively to gate 240 in response to detected inputs such as burglar and fire sensor inputs 274, status input 276 and emergency call input 278. On the other hand, utilization circuit control 268 not only transmits data along line 280 to gate 240, but also receives data in from the formatting logic. Utilization circuit control is coupled to utilization circuits by lines 282 and 284. The utilization circuit control is adapted to both detect the status of the utilization circuit for transmission as a digital code along line 280, and to control such status in response to digital code received in the data in signal from line 170. Such control can be either the operation of on and off controls, or even the operation of rheostats, through the use of stepping motors and the like.

Through the foregoing subsystems, one or more of which may be incorporated in each local station, as required, a telephone communication system is utilized to provide a substantial number of ancillary functions without material degradation of the voice communication, taking advantage of the high speed of multiplexed sampling in the system. Depending on the nature of the subsystem in the local receivers, the attendant and monitor station 34 would be provided with suitable monitoring and recording devices for detecting the outputs of the various subsystems, such as the burglar and fire control logic 264 and the status and emergency call circuit 266. Such attendant and monitor station would also include as required, control devices for applying suitable code signals to the data transfer buss 40 for the operation of particular utilization circuit controls 268 and message waiting and wake-up logic 250.

The digital data communication system according to the invention may be utilized in a plurality of environments including but not limited to office buildings, hospitals, and hotels. In each application, the system according to the invention offers the required flexibility to perform a plurality of functions utilizing the transmission medium normally available for the transmission of telephone communications. Thus, the otherwise required telephone communication system could be utilized for the monitoring of bedside instruments as by the use of a status and emergency call device 266, for the remote control of environmental systems such as the heating and cooling systems in hotels and hospitals through the use of utilization circuit control 268, and for the transmission of teletypewriter and data between local stations, and to the common carrier telephone system. The inherent flexibility of the system, including the readily displaceable and repositionable local stations offer substantial advantages over the known telephone systems.

A system according to the invention need not include the television and high fidelity sound and public address capabilities, in which case the high frequency carrier signal could be dispensed with. Further, each local station could be adapted to have more than one prewired address associated therewith, and other features found in the most flexible of telephone systems may be incorporated in the communication system according to the invention.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetwen.

What is claimed is:

1. A digital data communication system for connection between a user and a telephone system having a plurality of input channels comprising, central station means coupled to said telephone system for receiving analog signals therefrom and for applying analog signals thereto; a plurality of local station means each adapted to receive analog signals from said user and for supplying analog signals to said user; communication transmission means operatively coupling said plurality of local station means to said central station means, said central station means and said local station means both being adapted to coordinately digitize and multiplex the analog signals received thereby at a first sampling rate for producing a communication signal applied to said transmission means including a series of discrete digital signals in a series of time slots, both said central station means and said local station means being adapted to coordinately demultiplex and convert from digital to analog portions of said communication signal received thereby for applying selected analog signals to said telephone system input channels to said user respectively; and data transmission means for automatically substituting digital data signals for the discrete digital signals representative of said analog signals in periodically spaced selected ones of said time slots of said communication signal, said data transmission means causing said substitution to be made at a second rate substantially lower than said first sampling rate.

2. A digital data communication system as recited in claim 1, including a television receiver located at at least some of said local stations; said central station including means for frequency division multiplexing said communication signal and a television signal for applying both said communication signal and said television signal to said transmission line, at least the local stations having said television receivers located thereat including filter means for selectively receiving said television signal for application to said television receiver and said communication signal for operation thereon.

3. A digital data communication system as recited in claim 1, including an audio signal receiver located at at least a portion of said local stations; said central station including frequency division multiplexing means for simultaneously applying an audio signal from other than said telephone system and said communication signal to said transmission line, at least said local stations having said audio signal receiver located thereat including filter means for selectively applying said audio signal to said audio receivers and said communication signal for operation thereon by said local station.

4. A digital data communication system as recited in claim 1, wherein said data transmission means includes teletypewriter receiver and transmission means positioned at at least one of said local station means, and formatting means in said local station means coupled to said teletypewriter means for receiving a digital teletypewriter signal therefrom, and for substituting said teletypewriter signal for said discrete digital signals in periodically spaced time slots.

5. A digital data communication system as recited in claim 1, wherein said data transmission means includes utilization circuit means and status means coupled to said utilization circuit means for producing a status data signal representative of the status of said utilization circuit means for application to said communication signal on said transmission line.

6. A digital data communication system as recited in claim 5, wherein said utilization circuit means is disposable in at least two states by a user for the selective production of said status data signal.

7. A digital data communication system as recited in claim 5, wherein said utilization circuit is an alarm sensor means, said status data signal being representative of the detection of an alarm indication by said alarm sensor means.

8. A digital data communication system as recited in claim 1, wherein said data transmission means includes control means for transmitting a control data signal for insertion in said communication signal, at least one of said local stations including an adjustable utilization circuit means and a utilization circuit control means, said utilization circuit control means being responsive to the detection of said control data signal for the adjusting of said utilization circuit means in response thereto.

9. A digital data communication system as recited in claim 1, wherein said communication signal includes a plurality of multiplexed system channels of communication, said local station means including address storage means and means for comparing addresses in said communication signal with said stored address for identifying system channels intended for each respective local station means for operation thereon.

10. A digital data communication system as recited in claim 9, wherein said local station means includes means for detecting the availability of a system channel, and means for applying said address to said communication signal in response to the detection of the availability of a system channel in said communication signal and actuation by the user.

11. A digital data communication system as recited in claim 9, wherrein said data transmission means includes a teletypewriter receiver and transmission means positioned at at least one of said local station means, said local station means including means for detecting the availability of a system channel and formatting means coupled to said teletypewriter means for receiving the digital teletypewriter signal therefrom, and for substituting said teletypewriter signal for said discrete digital signals in periodically spaced time slots when said local station is communicating along a system channel, and for applying said address and said teletypewriter signal to an available system channel in said communication signal identified by said system channel detection means when said local station means is not communicating along a system channel.

12. A digital data communication system as recited in claim 9, wherein said data transmission means includes utilization cirrcuit means and status means coupled to said utilization circuit means for producing a status data signal representative of the status of said utilization circuit means, said local station means including means for detecting the availability of a system channel and formatting means coupled to said status means for receiving a digital status data signal therefrom, and for substituting said digital status data signal for the discrete digital signals in periodically spaced time slots when said local station means is communicating along a system channel, and for applying said address and said digital status data signal along an available system channel detected by said system channel detecting means when said local station means is not communicating along a system channel.

13. A digital data communication system as recited in claim 12, wherein said utilization circuit means is disposable in at least two states by a user for the selective production of said status data signal.

14. A digital data communication system as recited in claim 12, wherein said utilization circuit is an alarm sensor means, said status data signal being representative of the detection of an alarm indication by said alarm sensor means.

15. A digital data communication system as recited in claim 1, including a plurality of transmission lines coupled to said central station means, a plurality of said local station means being operatively coupled to each of said transmission lines.

16. A digital data communication system as recited in claim 1, including repeater means coupled to said transmission line intermediate said local station means and said central station means for resynchronizing and amplifying said communication signal.

17. A digital data communication system as recited in claim 1, wherein said central station means includes data transfer buss means; sample and hold means coupled to each input channel of said telephone system; sequencing means for governing the operation of said sample and hold means for controlling the sequence of multiplexing and de-multiplexing; an analog to digital converter means coupled to all of said sample and hold means for converting the sampled analog signals from the respective input channels of said telephone system to digital form for application to said data transfer buss means; and digital to analog converter means for receiving digital signals from said data transfer buss and for applying a series of samples of analog signals to all of said sample and hold means, said sample and hold means associated with each of said input channels applying selected analog signal samples in periodically spaced time frames for application to the respective input channel in response to said sequencing means.

18. A digital data communication system as recited in claim 17, including a plurality of transmission lines coupled to said central station means, a plurality of said local station means being operatively coupled to each of said transmission lines, said central station means including means coupled to said sequencing means for control thereby interconnecting each of said transmission lines with said data transfer buss for applying the discrete digital signals in separate time frames associated with each transmission line to said transmission line.

19. A digital data communication system as recited in claim 1, wherein said communication signal includes a plurality of multiplexed system channels, said central station means including attendant and monitoring control means for permitting manual assignment and monitoring of said system channels, and for receiving at least a portion of the digital data signals transmitted by said data transmission means.

20. A digital data communication system as recited in claim 1, wherein said local station means is releasably coupled to said transmission line for selective positioning at a plurality of locations therealong, said local station means including address storage means, means for comparing addresses on said communication signal with said stored address for identifying system channels intended for each respective local station means for operation thereon and means for applying said address to said communication signal upon actuation by said user.

21. A digital data communication system as recited in claim 1, wherein said communication signal includes a plurality of system channels, said central station means including control logic means for regulating the assignment of system channels between said input channels and said local station means in accordance with predetermined criteria, said control logic means being reprogrammable for selective changes in such criteria.

22. A digital data communication system, comprising at least two two-way communication stations; communication transmission means for operatively coupling said two-way communication stations; each of said two-way communication stations being adapted to receive and transmit analog signals, and being adapted to coordinately digitize and multiplex the analog signals received thereby at a first sampling rate for producing a communication signal applied to said transmission means including a series of discrete digital signals in a series of time slots, each of said two-way communication stations being further adapted to coordinately demultiplex and convert from digital to analog portions of said communication signal received thereby for retransmitting said analog signals; and data transmission means for automatically substituting digital data signals for the discrete digital signals representative of said analog signals in periodically spaced selected ones of said time slots of said communication signal, said data transmission means causing said substitution to be made at a second rate substantially lower than said high sampling rate.

* * * * *